Dec. 5, 1933.  L. M. HENDERSON ET AL  1,937,518
HYDROCARBON WAX
Filed April 28, 1931
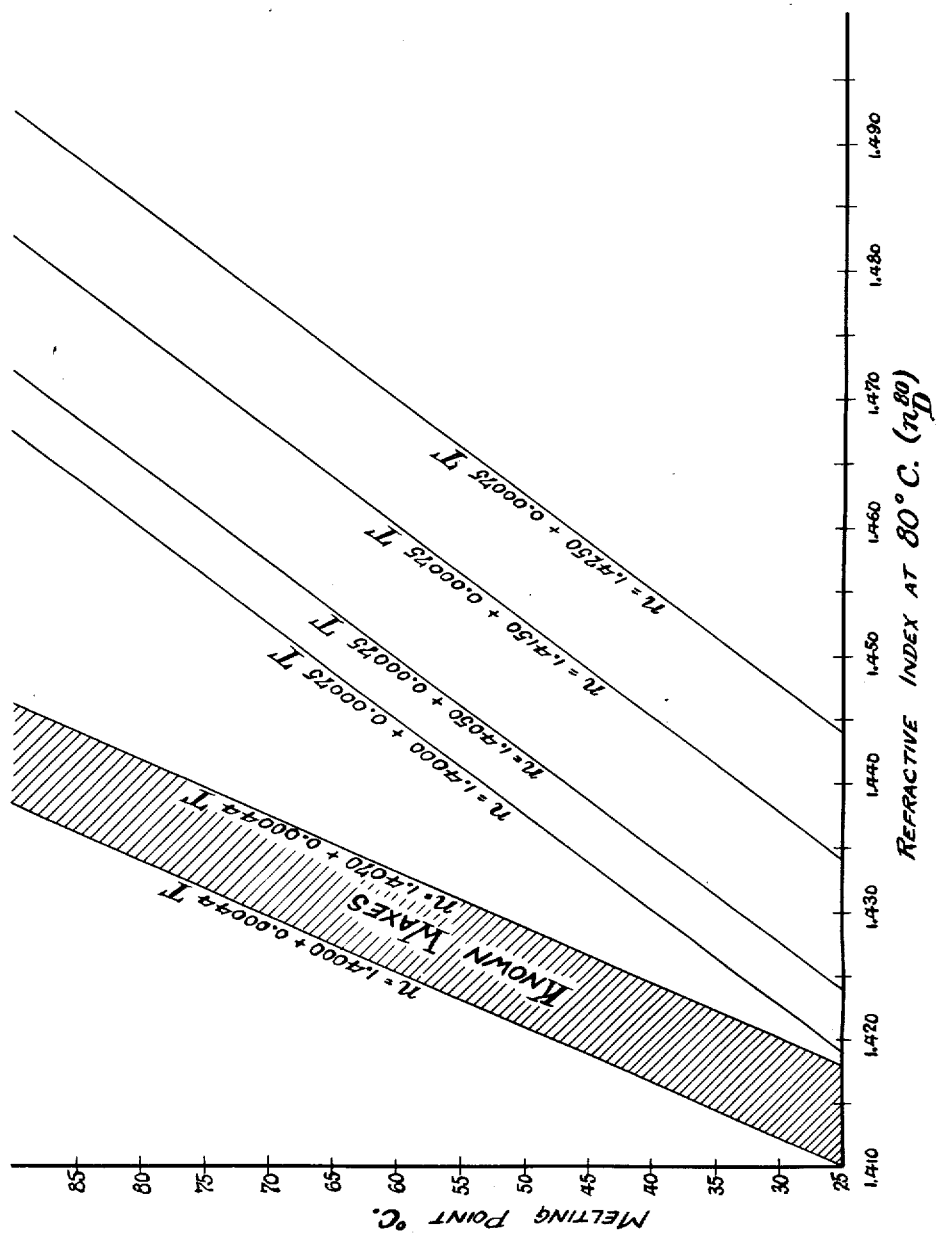
Inventors
Lawrence M. Henderson,
Seymour W. Ferris,
and Henry C. Cowles, Jr., Patented Dec. 5, 1933

1,937,518

UNITED STATES PATENT OFFICE 1,937,518

HYDROCARBON WAX

Lawrence M. Henderson, Narberth, Seymour W. Ferris, Lansdowne, and Henry C. Cowles, Jr., Philadelphia, Pa., assignors to The Atlantic Refining Company, Philadelphia, Pa., a corporation of Pennsylvania Application April 28, 1931. Serial No. 533,486

19 Claims. (Cl. 196—149)

The present invention concerns new wax products, particularly hydrocarbon waxes which possess characteristic and novel properties. A specific aspect of our invention concerns waxes from crude petroleum sources. It also relates to a method for producing such new products. It is to be understood that our invention is not to be limited because of the particular method for preparing our wax products herein disclosed, nor by reason of the particular specific sources thereof herein given.

Briefly, our new hydrocarbon waxes are more ductile, more workable, and more sticky or tacky than hydrocarbon waxes heretofore known. They are further characterized in that they have higher refractive indices than hydrocarbon waxes of corresponding melting points heretofore known, which latter may, in general, be characterized as hard, non-sticky, and rather brittle substances.

In many of the uses to which hydrocarbon waxes have been put in the past, a great need has been felt for waxes having many of the characteristic hydrocarbon wax properties, but differing from the ordinary hydrocarbon waxes in other properties, such as plasticity, workability and stickiness. For example, if certain articles, such as the well known waxed paper or waxed containers are impregnated or coated with the usual hydrocarbon waxes, as for example, for waterproofing or acid proofing, it is well known that the waxes will crack when such articles are subjected to use and ordinary handling at low temperatures, because the wax lacks ductility. In order to have a wax of desired plastic and/or sticky properties, it has been necessary heretofore to employ, either alone or admixed with hydrocarbon waxes, other materials such as beeswax, japan wax, and/or resins.

To provide waxes composed entirely of hydrocarbons, that are plastic, sticky and workable is among the objects of our invention. However, it is to be understood that our new products, because of their different and distinctive properties, may be put to a multiplicity of uses in addition to those given herein by way of illustration.

A brief account of ordinary hydrocarbon waxes and the usual processes by which they are manufactured will be of assistance in distinguishing such waxes from our novel wax products. Most crude petroleums, and particularly those of the so-called paraffin-base or mixed-base types, contain certain hydrocarbons commonly known as paraffin wax. Such wax has been found to contain at least three fundamentally distinct crystalline types of wax, namely: plate, malcrystalline and needle waxes. Present refining methods, particularly sweating, have a tendency to remove the malcrystalline and needle type waxes with the oil, and leave as solid the plate type waxes, so that the finished waxes tend for the most part to approach toward the plate type. In the usual methods of refining crude petroleum, the crude is subjected to distillation thereby to separate it into a number of fractions of varying volatilities and viscosities. The fraction known as "paraffin distillate", which, in general, is a fraction having a boiling range of the order of from about 170° C. (340° F.) to about 310° C. (590° F.), when distilled under an absolute pressure of 10 m.m. of mercury, and which ordinarily is obtained from paraffin base and mixed base crudes, is separated into a solid wax fraction and a liquid oil fraction by chilling and filter-pressing. The solid fraction or crude wax collected in the filter press is known as "slack wax", and contains a large quantity of oil. This oil is removed or reduced by subjecting the slack wax to a "sweating" operation which consists essentially in fractionally melting and draining the oil and/or lower melting waxes from higher melting waxes. The waxes resulting from the sweating operation are then further refined by any of the well-known processes, such as by treatment with sulphuric acid and/or percolation through fuller's earth. The products so obtained are the ordinary paraffin waxes of commerce, and are graded according to their melting points, into products differing in hardness and other properties. All of these products however, may, in general, be classed as hard and brittle, except at temperatures approaching their melting points; furthermore, they tend to crystallize rather coarsely.

After the paraffin distillate cut, usually there is separated from the crude during the distillation another higher boiling cut, known as the high viscosity fraction. This fraction also contains wax, but because of its particular crystalline form, it does not lend itself to separation directly by filter-pressing. Instead, this fraction is usually cold settled or centrifuged to effect a comparatively rough separation of the wax from the oil. The wax together with considerable oil, as it is separated by the cold settling or centrifuging operation, is known as "petrolatum stock", and contains a micro-crystalline form of wax generally known as "slop wax". Certain high melting waxes are occasionally obtained from "petrolatum stock"

by repeated recrystallizations and settlings from naphtha solution, which high melting waxes do not have refractive indices of the order of those of our novel waxes of corresponding melting points. However, petrolatum stock cannot be successfully processed by either pressing or sweating. As a rule, the wax in petrolatum stock is not recovered, but is cracked or otherwise disposed of.

There are, in addition to the wax sources aforesaid, the residual stocks which contain a microcrystalline wax, commonly known as petrolatum wax. This wax usually is not processed into a finished wax product, but becomes a slop wax, or in some cases, after separation is employed in the production of petroleum jellies or the like.

From the aforesaid, it will be noted that, in general, there are three classifications of hydrocarbon waxes used among petroleum refiners, namely: 1. Paraffin wax, 2, slop wax, and 3, petrolatum wax. This classification is not to be confused with the other classification herein employed, which specifies: 1. Needle wax, 2, malcrystalline wax, and 3, plate wax. This latter classification has particular reference to crystalline structure, while the former is a rough classification used in refining practice and signifies in a measure the use to be made of the wax contained in a certain batch of material, and the method to be employed in handling it.

In the further treatment of slack wax from the filter press, as referred to above in connection with the processing of "paraffin distillates", the wax cake is melted and run into sweating pans, wherein it is cooled to a temperature substantially below its melting point, and thereafter heated to cause the oil occluded in the slack wax to exude therefrom. The wax which is left after the first sweating is known as "crude scale" wax, and is usually resweated one or more times in the production of refined waxes. The oil which exudes from this crude scale wax on resweating, carries with it some waxes which roughly may be designated as "wax intermediates". These waxes are to a large extent lost from the final sweated wax products. Also, the oil passing from the wax in the first sweating, generally referred to as "foots" oil, carries with it substantial quantities of waxes which are in general not recovered.

It will be seen, therefore, that the usual methods of wax recovery do not provide for the recovery of many waxes which may be of moderately high-melting point, but which because of their high solubility in the oil are sweated out with and retained in the oil.

We have discovered that waxes which by prior processes remain in the oil, as pointed out above, may be recovered and upon recovery have highly desirable properties. Further, we have succeeded in preparing a series of hydrocarbon waxes of very desirable properties quite different from those of the hydrocarbon waxes heretofore known. These waxes may be prepared from "foots" oil, or intermediate waxes from the sweating operation, or from petrolatum stock or "slop wax", or in short, from practically any oil which contains waxes lost by customary methods of wax recovery, of which methods those given above are typical.

We may employ any of a variety of methods, as well as any of a variety of starting materials. However, for a better understanding of our invention, we describe a specific process without intending to be limited thereto. Such description covers one satisfactory method of preparation of our novel wax products and a satisfactory choice of starting materials. Seventy-five parts of slack wax from a Mid-Continent crude were mixed with twenty-five parts of "petrolatum stock" from a similar crude. This oil-wax mixture was de-oiled by dissolving it at temperatures of the order of 50° C. in ethylene dichloride, using approximately ninety parts of ethylene dichloride to ten parts of the mixture. The solution was then cooled to between −15° C. and −10° C., and the portion which crystallized out was again treated in the same way. This process was repeated until four recrystallizations had been effected. The resulting material from the last of the four recrystallizations, which was a substantially oil-free wax was fractionally distilled, under an absolute pressure of approximately 10 m.m. of mercury using steam until 20% bottoms remained. The fractions were collected, the first fraction containing 5% of the total volume of the material subjected to distillation. Then five 15% fractions, each of a successively higher boiling range than the one preceding, were collected. Each of the 15% fractions was split by means of fractional crystallization from ethylene dichloride in the manner in which crystallization was previously effected, except that the temperature was so controlled that the desired quantity of wax was crystallized out of each fraction, using 9 parts by volume of ethylene dichloride to 1 part by volume of the fraction. The results of this procedure are shown in Table 1 given below:

*Table 1*

| % | Crystallization fractions | | | | | | | D.H. @ 30° C. |
|---|---|---|---|---|---|---|---|---|
| | M.P. °C. | % | Wax No. | M.P. °C. | $n_D^{60}$ | Flow point °C. | 85 D.H. °C. | |
| 0–5 | 35.5 | | 1 | | | | | |
| 5–20 | 42 | 79 | 2 | 42.4 | 1.4219 | 37 | 19.5 | 48 |
| | | 21 | 3 | 40.0 | 1.4209 | 33.5 | 14 | 30 |
| 20–35 | 48 | 62 | 4 | 50.0 | 1.4253 | 40.5 | 33 | 90 |
| | | 38 | 5 | 45.0 | 1.4246 | 34. | 17 | 9 |
| 35–50 | 53 | 36 | 6 | 56.4 | 1.4282 | 46 | 25 | 92 |
| | | 28 | 7 | 55.6 | 1.4278 | 45 | 34.5 | 91 |
| | | 36 | 8 | 47.6 | 1.4282 | 28 | 12 | 0 |
| 50–65 | 57 | 30 | 9 | 64.0 | 1.4316 | 55.5 | 34 | 88 |
| | | 34 | 10 | 61.0 | 1.4316 | 48.5 | 34 | 89 |
| | | 36 | 11 | 43.6 | 1.4361 | 24 | −7.5 | 0 |
| 65–80 | 62 | 38 | 12 | 70.0 | 1.4357 | 63 | 31 | 86 |
| | | 27 | 13 | 56.2 | 1.4395 | 40 | −5 | 21 |
| | | 35 | 14 | 43.0 | 1.4428 | 25 | −10.5 | 0 |
| 20% Bottoms | 66.8 | 25 | 15 | 75.0 | 1.4484 | 59 | 30.5 | 86 |
| | | 29 | 16 | 54.0 | 1.4536 | 38.5 | 10 | 24 |
| | | 23 | 17 | 60.3 | 1.4546 | 29.5 | 6 | 0 |
| | | 23 | 18 | 32.0 | 1.4610 | 16 | −7 | 0 |

For example, the 5–20% fraction was dissolved in ethylene dichloride and chilled until 79% thereof separated out. This 79% made up wax #2. The remaining 21% was obtained by chilling the solution much further, as for example, to −15° C., and was labeled wax #3. A similar mode of procedure was followed in obtaining the other waxes shown. The waxes were next given a treatment for color improvement, and their properties then determined. Waxes 2, 3, 4, 6, 7, 9, 10 and 12 shown in Table 1 were each treated for color improvement with 18 pounds of fuming sulphuric acid per 100 pounds of wax, at 15° to 25° C. The acidity was neutralized with sodium carbonate and the wax was then filtered through clay. Waxes 5, 8, and 13, shown in Table 1, were treated similarly to the above mentioned waxes with the addition of a further wash with 66° Bé. sulphuric acid before the sodium carbonate treatment. With waxes 11, 14, 15, 16, 17 and 18, shown in the table, the treatment was confined to clay filtration.

Table 1 further indicates the properties of the waxes produced by this choice of starting materials and treatment. In the table the melting point was obtained by A. S. T. M. method D—87—22. The refractive index ($n_D^{80}$) was determined by a suitable refractometer at 80° C. Columns 7, 8 and 9 designated respectively as, flow point °C., 85 D. H. °C., and D. H. at 30° C., show the hardness characteristics of the wax and were obtained by means of an instrument known as the Durometer, supplied by the Shore Instrument Manufacturing Company. This instrument consists of a plunger which is pressed against the wax and the depth of penetration of which is indicated by readings on a dial ranging from 0 to 100. The 100 Durometer reading indicates no penetration while the 0 reading indicates complete penetration. The flow point (column 7) is the lowest temperature at which a 0 hardness reading is obtained. The 85 D. H. reading is the temperature at which the Durometer records 85 hardness, and the D. H. at 30° C. reading is the actual Durometer scale reading at 30° C. It will be seen that all three points are measures of the hardness characteristics and their variation with temperature. The products shown in Table 1 are capable of some variation by varying the treatment, but it is not hoped that all the waxes which we hereinafter claim as novel can be advantageously produced with this single combination of starting materials. As another choice of starting materials, we may choose a mixture of oil and wax intermediates which result from a normal sweating operation, and treat it similarly to the above described process, or we may modify the process in various ways which will become apparent to one skilled in the art, from what has been set forth above. Again, we may employ a combination of "foots" oil, slack wax, and slop wax as the starting material. Or again, for a special purpose, we may extract the wax which is dissolved in the oil passing out of the filter press, and either alone or in combination with wax intermediates, petrolatum stock, "foots" oil and/or normal finished wax products, treat the combination, for example, by the process indicated above or a modification thereof, and thereby finish with a set of products differing from those derived from other combinations of starting materials or modes of processing.

By processing a number of combinations of starting materials, either by the process outlined above, or by a modification thereof, a series of waxes may be produced which for a given melting point have varying refractive indices. Also, we have prepared waxes whose boiling points, hardness, ductility, and stickiness vary, as does the refractive index, for a given melting point. In general, the wax of highest refractive index will be softest, stickiest, and most ductile. We have been able to prepare a series of waxes of the same general degree of hardness, ductility or stickiness, but with a wide range of melting points; or, in other words, we have been able to prepare waxes of the same melting points, but with a wide range of hardness, ductility, stickiness, and boiling points.

These novel waxes may be roughly differentiated from the normal hydrocarbon waxes of corresponding melting points in one or more of the following respects:

1. They possess much higher boiling points than the corresponding waxes heretofore known;
2. They are much softer and more sticky than the corresponding waxes heretofore known;
3. Their crystalline structure is much finer than the corresponding waxes previously known;
4. Their indices of refraction are substantially higher than the corresponding known waxes;
5. Their molecular weights are much higher than the corresponding known waxes.

While all of these differences are significant, we regard the relation between melting point and refractive index as the best single criterion to differentiate our hydrocarbon waxes from those known heretofore, not because the refractive index is the most important point of distinction, but because no thoroughly satisfactory and universally accepted method has been developed for expressing the stickiness, ductility, or hardness of waxy materials. However, it can be seen from the data in Table 1 that the refractive index serves as a fairly good criterion of those other important properties.

The drawing is a graph which illustrates the differences between our waxes and the common paraffin waxes, on the basis of the melting point—refractive index relationship. Refractive indices at 80° C. are shown as the abscissæ, and the melting points as determined by A. S. T. M. method No. D—87—22 are shown as ordinates. On the graph the common types of paraffin waxes lie within a relatively narrow band having refractive indices as a rule falling numerically above and graphically to the right of that defined by the expression $n=1.4000+0.00044\ T$, but having refractive indices falling numerically below or graphically to the left of that defined by the expression $n=1.4070+0.00044\ T$, where $n$ is refractive index at 80° C., and $T$ is melting point in °C. A few waxes have been reported which fall outside of this band, but all, nevertheless, have refractive indices numerically below that defined by the expression, $n=1.4000+0.00075\ T$. The waxes which we have made and which we claim as new, on the other hand, all have indices of refraction greater than those derived from this last expression.

Herein and in the appended claims wherever "refractive index" is referred to, we mean refractive index for the D line at 80° C.

We have found that the further our waxes lie from the normal paraffin waxes on a graph as shown in the drawing, or the greater amount by which their refractive indices exceed the values computed from the expression, $n=1.4000+0.00075\ T$, the more distinctive their properties become from those of the previously known waxes. This is noticed particularly in an increased pliability and decreased brittleness of the wax even at temperatures far below their melting points. For example, we find that waxes whose refractive indices are numerically greater than the value derived from the expression $n=1.4050+0.00075\ T$ have more pronounced properties than those less than this value, and that those waxes whose refractive indices exceed the figure given by the expression $n=1.4150+0.00075\ T$ are even more unusual. Our most unusual waxes have refractive indices greater than $1.4250+0.00075\ T$.

As an example of the differences in hardness characteristics between our novel waxes and those heretofore known, one of our novel waxes with a melting point of 54° C. has a durometer hardness of less than 85 at temperatures above 10° C. That is, this wax retains an appreciable degree of softness at a temperature 44° C. below its melting point. This novel wax has a refractive index greater than that given by the formula $n = 1.4050 + 0.00075\ T$. A normal hydrocarbon wax product of corresponding melting point, 54.3° C., typical of those heretofore known, reaches 85 durometer hardness at 27.5° C., which is only 26.8° C. below its melting point. As a second example of such difference, one of our novel waxes with a melting point of 43.6° C. reaches 85 durometer hardness at a temperature 50.6° C. below its melting point, whereas a typical normal hydrocarbon wax product of the known type, having a melting point of 45° C., attains a corresponding hardness only 33.5° C. below its melting point. This second novel wax has a refractive index greater than that given by the formula $n = 1.4000 + 0.00075\ T$.

While by suitable choice of the starting materials and process of preparation, we have been able to extend the melting points of our novel waxes at will both up and down, we have been most interested in those products with melting points between 25° C. and 75° C. Those products with melting points below 50° C., are in general useful where waxes with melting points similar to those of the normal paraffin waxes are desired, but where greater flexibility and less brittleness are required. As typical of some of the novel waxes which we have prepared we have shown in Table 2 below the melting points and refractive indices of a number of these:

*Table 2*

| M.P. | $n_D^{80}$ |
|---|---|
| 22.5 | 1.4788 |
| 26.0 | 1.4704 |
| 26.4 | 1.4649 |
| 29.4 | 1.4380 |
| 32.0 | 1.4610 |
| 32.2 | 1.4530 |
| 35.1 | 1.4275 |
| 35.2 | 1.4359 |
| 39.0 | 1.4525 |
| 43.6 | 1.4361 |
| 47.0 | 1.4612 |
| 54.0 | 1.4468 |
| 54.0 | 1.4536 |
| 56.6 | 1.4430 |
| 60.3 | 1.4546 |
| 64.0 | 1.4485 |

We have shown in Table 2, by way of illustration of our novel waxes, waxes ranging in refractive index up to substantially 1.4800, and while waxes above this point are not shown, we are able by suitable treatment as described, or modifications which will be obvious from what has been said heretofore, to prepare waxes not confined to the range illustrated.

Oil wax mixtures may possibly be obtained, which have relatively high indices of refraction. However, our novel products are distinct from these in that they are substantially oil-free waxes. This is shown by the fact that they may be substantially completely (98% or more) recrystallized from ethylene dichloride at 0° F., using nine volumes of ethylene dichloride per volume of wax, and furthermore, that the properties, for example the refractive index-melting point relationship of such recrystallized waxes, will be substantially the same as those of the original materials.

A discussion of the various and sundry uses to which our new wax products can be put, other than what has been stated briefly heretofore, would require more elaboration than need here be given. It suffices to direct attention to the fact that our invention has made it possible to produce substantially oil-free hydrocarbon waxes of a very wide range of properties, such as have not been known heretofore.

While herein we have given crude petroleum, by way of example, as a specific source from which our novel products may be prepared, we do not intend to limit ourselves thereby, but insofar as products are concerned intend to include all hydrocarbon waxes which come within the scope of the appended claims, whether they be derived from petroleum, oil shale, ozokerite, asphalt, or other similar crude materials, or from products resulting from the carbonization of coal, or even from products derived synthetically.

It is to be understood that, while ethylene dichloride is specified as a desirable solvent to be employed in the process of producing our novel waxes various other equivalent organic and/or inorganic solvents may serve as substitutes therefor, any suitable solvent being within our contemplation.

The steps involving color removal herein specifically set forth, may be varied or even omitted without the resulting product being beyond the scope of our invention. Also where steam is specified as the distilling aid in the fractional distillation of the oil-free wax, it is to be understood that other non-reacting distilling aids may be used as substitutes therefor.

In the appended claims, when melting points are referred to, we mean melting points measured by A. S. T M. method D—87—22.

What we claim is:

1. A substantially oil-free hydrocarbon wax having a refractive index measured at 80° C. greater than that derived from the expression $n = 1.4000 + 0.00075\ T$, where $n$ denotes the value of the refractive index and $T$ denotes the melting point of the wax in °C.

2. A substantially oil-free hydrocarbon wax having a refractive index measured at 80° C. greater than that derived from the expression $n = 1.4050 + 0.00075\ T$, where $n$ denotes the value of the refractive index and $T$ denotes the melting point of the wax in °C.

3. A substantially oil-free hydrocarbon wax having a melting point between 25° C. and 75° C., and having a refractive index measured at 80° C. greater than that derived from the expression $n = 1.4000 + 0.00075\ T$, where $n$ denotes the value of the refractive index, and $T$ denotes the melting point of the wax in °C.

4. A substantially oil-free hydrocarbon wax having a melting point between 25° C. and 75° C., and having a refractive index measured at 80° C. greater than that derived from the expression $n = 1.4050 + 0.00075\ T$, where $n$ denotes the value of the refractive index, and $T$ denotes the melting point of the wax in °C.

5. A substantially oil-free hydrocarbon wax having a melting point between 25° C. and 75° C., and having a refractive index measured at 80° C. greater than that derived from the expression $n = 1.4150 + 0.00075\ T$, where $n$ denotes the value of the refractive index, and $T$ denotes the melting point of the wax in °C.

6. A substantially oil-free hydrocarbon wax having a melting point between 25° C. and 75° C., and having a refractive index measured at 80° C. greater than that derived from the expression $n = 1.4250 + 0.00075\ T$, where $n$ denotes the value of the refractive index, and $T$ denotes the melting point of the wax in °C.

7. A substantially oil-free hydrocarbon wax having a melting point between 25° C. and 75° C., and having a refractive index measured at 80° C.

greater than that derived from the expression $n=1.4000+0.00075\ T$, and less than 1.4800, where $n$ denotes the value of the refractive index, and $T$ denotes the melting point of the wax in °C.

8. A substantially oil-free hydrocarbon wax having a melting point between 25° C. and 50° C., and having a refractive index measured at 80° C. greater than that derived from the expression $n=1.4000+0.00075\ T$, where $n$ denotes the value of the refractive index, and $T$ denotes the melting point of the wax in °C.

9. A substantially oil-free hydrocarbon wax having a melting point between 25° C. and 50° C., and having a refractive index measured at 80° C. greater than that derived from the expression $n=1.4000+0.00075\ T$, and less than 1.4800, where $n$ denotes the values of the refractive index, and $T$ denotes the melting point of the wax in °C.

10. A substantially oil-free hydrocarbon wax having a melting point between 25° C. and 50° C., and having a refractive index measured at 80° C. greater than that derived from the expression $n=1.4000+0.00075\ T$, and less than that derived from the expression $n=1.4150+0.00075\ T$, where $n$ denotes the value of the refractive index, and $T$ denotes the melting point of the wax in °C.

11. A substantially oil-free hydrocarbon wax having a melting point between 25° C. and 50° C., and having a refractive index measured at 80° C. greater than that derived from the expression $n=1.4150+0.00075\ T$, and less than that derived from the expression, $n=1.4250+0.00075\ T$, where $n$ denotes the value of the refractive index, and $T$ denotes the melting point of the wax in °C.

12. A substantially oil-free hydrocarbon wax having a melting point between 25° C. and 50° C. and having a refractive index measured at 80° C. greater than that derived from the expression $n=1.4250+0.00075\ T$, and less than 1.4800, where $n$ denotes the valve of the refractive index, and $T$ denotes the melting point of the wax in °C.

13. A substantially oil-free hydrocarbon wax having a melting point between 25° C. and 50° C., and having a refractive index measured at 80° C. greater than that derived from the expression $n=1.4050+0.00075\ T$, and less than that derived from the expression $n=1.4150+0.00075\ T$, where $n$ denotes the value of the refractive index, and $T$ denotes the melting point of the wax in °C.

14. A substantially oil-free hydrocarbon wax having a melting point between 50° C. and 75° C., and having a refractive index measured at 80° C. greater than that derived from the expression $n=1.4000+0.00075\ T$, where $n$ denotes the value of the refractive index, and $T$ denotes the melting point of the wax in °C.

15. A substantially oil-free hydrocarbon wax having a melting point between 50° C. and 75° C., and having a refractive index measured at 80° C. greater than that derived from the expression $n=1.4000+0.00075\ T$, and less than 1.4800, where $n$ denotes the value of the refractive index and $T$ denotes the melting point of the wax in °C.

16. A substantially oil-free hydrocarbon wax having a melting point between 50° C. and 75° C., and having a refractive index measured at 80° C. greater than that derived from the expression $n=1.4000+0.00075\ T$, and less than that derived from the expression $n=1.4150+0.00075\ T$, where $n$ denotes the value of the refractive index, and $T$ denotes the melting point of the wax in °C.

17. A substantially oil-free hydrocarbon wax having a melting point between 50° C. and 75° C., and having a refractive index measured at 80° C. greater than that derived from the expression $n=1.4150+0.00075\ T$, and less than that derived from the expression $n=1.4250+0.00075\ T$, where $n$ denotes the value of the refractive index, and $T$ denotes the melting point of the wax in °C.

18. A substantially oil-free hydrocarbon wax having a melting point between 50° C. and 75° C., and having a refractive index measured at 80° C. greater than that derived from the expression $n=1.4250+0.00075\ T$, and less than 1.4800, where $n$ denotes the value of the refractive index, and $T$ denotes the melting point of the wax in °C.

19. A substantially oil-free hydrocarbon wax having a melting point between 50° C. and 75° C. and having a refractive index measured at 80° C. greater than that derived from the expression $n=1.4050+0.00075\ T$, and less than that derived from the expression $n=1.4150+0.00075\ T$, where $n$ denotes the value of the refractive index, and $T$ denotes the melting point of the wax in °C.

LAWRENCE M. HENDERSON.
SEYMOUR W. FERRIS.
HENRY C. COWLES, Jr.